United States Patent
Polevoy et al.

(10) Patent No.: US 7,007,321 B2
(45) Date of Patent: Mar. 7, 2006

(54) SIDE RAIL END CONNECTION SYSTEM FOR BED FRAME

(75) Inventors: Richard S. Polevoy, Teaneck, NJ (US); Howard Scott Ryan, Skaneateles, NY (US); Paul Eric Carlson, Skaneateles, NY (US)

(73) Assignee: Finger Lakes Intellectual Property LLC, Teaneck, NJ (US)

( * ) Notice: Subject to any disclaimer, the term of this patent is extended or adjusted under 35 U.S.C. 154(b) by 0 days.

(21) Appl. No.: 10/993,414

(22) Filed: Nov. 19, 2004

(65) Prior Publication Data

US 2005/0217027 A1  Oct. 6, 2005

Related U.S. Application Data

(60) Provisional application No. 60/524,136, filed on Nov. 21, 2003.

(51) Int. Cl.
  *A47C 19/02*  (2006.01)
(52) U.S. Cl. .................. 5/288; 5/298; 5/296; 5/301
(58) Field of Classification Search .............. 5/288, 5/290, 296–299, 301, 304, 907; 248/243, 248/344, 220.21; 403/230, 231, 321, 322.1, 403/322.4
See application file for complete search history.

(56) References Cited

U.S. PATENT DOCUMENTS

| | | | | | |
|---|---|---|---|---|---|
| 470,246 | A | * | 3/1892 | Liebe ............................ | 5/288 |
| 1,518,970 | A | * | 12/1924 | Dyke ............................ | 5/296 |
| 1,695,962 | A | * | 12/1928 | Howse ........................... | 5/298 |
| 2,261,820 | A | * | 11/1941 | Zimtbaum ...................... | 5/297 |
| 2,425,927 | A | * | 8/1947 | Elrad ............................ | 5/288 |
| 2,648,074 | A | * | 8/1953 | Jonas ............................ | 5/296 |

* cited by examiner

*Primary Examiner*—Michael Trettel
(74) *Attorney, Agent, or Firm*—Klauber & Jackson

(57) ABSTRACT

A system for connecting side rails of a bed frame with a headboard and/or footboard. A hook plate is affixed to the side rails and has a pair of hooks extending outwardly from the ends of the side rails. The hooks form slots in the hook plates and the slots have forward edges formed at a predetermined angle with respect to the vertical. A receiver housing is affixed to the headboard and/or footboard and has a vertical opening with a pair of transverse pins that span that opening. The side rails are affixed to the headboard and/or footboard by inserting the hooks into the vertical opening to engage the pins. A lever arm, pivotally affixed to the receiver housing, can be pivoted to force the hook plate downwardly to forcefully engage and lock the forward edge of the slots with the pins.

34 Claims, 14 Drawing Sheets

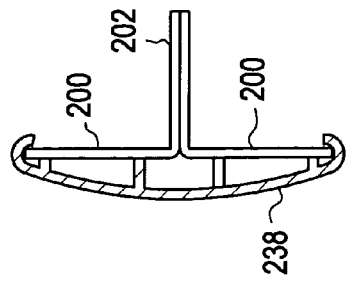
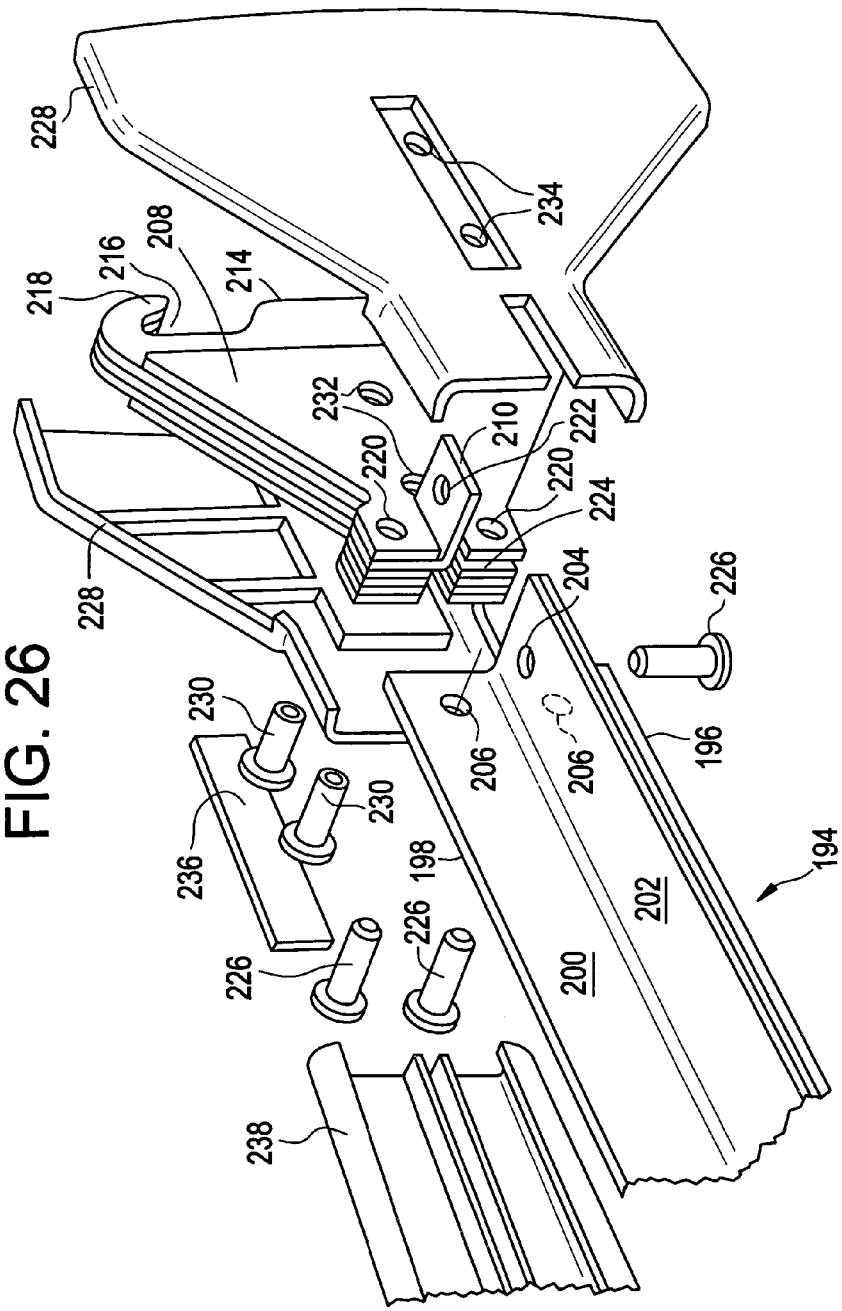

SIDE RAIL END CONNECTION SYSTEM FOR BED FRAME

CROSS-REFERENCE TO RELATED APPLICATIONS

The present application is based upon U.S. Provisional patent application 60/524,136 filed Nov. 21, 2003 and entitled "SIDE RAIL END CONNECTION SYSTEM FOR BED FRAME".

BACKGROUND OF THE INVENTION

The present invention relates to a bed frame construction and, more particularly, to a system used with a bed frame to attach the side rails to a headboard and/or a footboard.

In general, a common bed frame system consists of a headboard and a footboard that are connected by two side rails that support the mattress and the box spring. While there may be differing ways to affix the side rails to the headboard and footboard, one of the most common is to bolt the side rails to the footboard and headboard or to assembly the side rail to the footboard and headboard with the use of a set of vertically space apart hooks that extend outward from the ends of the side rails and which enter vertically disposed slots formed in the headboard and footboard. Within each of the slots there are located a set of transversely located pins that cross the slots and are securely mounted in the headboard and footboard. Thus, with the pin and hook system, the hooks enter the slots and hook over the pins to secure the side rails to the headboard and the footboard.

There are disadvantages of both of these known systems. With the bolt-on system, there is the difficulty in assembling a number of separate parts at a time and the need to utilize, and therefore require, a tool or tools to carryout the bolting procedure. It would be more advantageous to have a system that would be effective to affix the side rail to the headboard and footboard without the need for any tools by the assembler. As to the hook and transverse pin system, the connection is subject to loosening and which can allow the headboard and footboard to rock and, therefore, not create a lasting solid connection. In addition, with the use of hooks, if the user attempts to lift the bed frame by raising the side rails, those side rails will become disconnected as they lift out of the engagement with the headboard or footboard. It is not possible, therefore to readily lift the bed frame itself by grasping and raising the side rail and that technique is otherwise a very convenient way to lift the bed frame.

A fairly recent example of the hook and pin type of system to affix the side rail to a headboard and footboard is shown and described in U.S. Pat. No. 6,173,460 B1 of Mitchell where a specially designed fastener is disclosed that can be used with the traditional system, however, the hooking arrangement is unchanged and there is no system shown in Mitchell to better affix the hooks to the pins so as to eliminate the eventual rocking problem.

Thus, it would be advantageous to have a system that can be used to affix a side rail to a headboard and/or a footboard that provides a solid connection and which forcefully affixes the side rail in its desired affixed position to the headboard and footboard without the need for any tools in carrying out that affixation and after completion of the connection, where the bed frame can be lifted for moving that bed frame by grasping and raising the side rails.

SUMMARY OF THE INVENTION

Now, in accordance with the present invention, there is a provided a bed frame construction having a specially constructed system to affix the bed rail to the headboard and/or a footboard. As will be hereinafter described, the present invention will be set forth as utilized n a bed frame, however, it will be understood that the connection system of the present invention can be used in any number of other situations where there is a ninety degree connection between two structural members, including shelving, scaffolding and the like. Also, the present invention can be situated in reverse orientations, that is, since the connection and disconnection is unaffected by gravity, the connection system can be used to make the connection with a downward motion, as will be herein described, or an upward movement.

The present invention is applicable for use with wooden or metal side rails and can be used to affix side rails to the headboard or footboard of a bed frame. With the present invention, there are a pair of hooks, vertically spaced apart, that extend longitudinally outwardly from the ends of the side rails. A receiver housing is affixed to the footboard or headboard with an opening and with a pair of pins that extend laterally across the opening so that, in the assembly of the bed frame, the pair of hooks of the side rails enters the opening in the receiver housing and fit over the pins to carry out the initial affixing of the side rails to the headboard or footboard.

The form of the hook is comprised of a slot formed in a metal plate or laminated plates and that slot has a forward or leading edge that faces the headboard or footboard and that forward edge is formed at a predetermined steep angle with respect to the vertical, preferable at an angle of about 5 degrees to about 15 degrees and more preferably, at an angle of about 10 degrees.

Once the hooks have made an initial engagement with the pins, a lever arm that is pivotal affixed to the receiver housing can be rotated such that the lever arm contacts the upper surface of the metal hook plate forming the hooks and further rotation of the lever arm pushes downwardly on the metal hook plate to drive the forward edge of the slots and the pins together in a forceful engagement. With the downward movement of the hook plate brought about by the force of the lever arm on the hook plate, the receiver housing is drawn toward the hook plate to better and more firmly affix the side rail to the headboard or footboard.

Once the lever arm has reached a certain point of rotation, thereby creating sufficient downwardly directed force on the hook plate, there is a locking mechanism that secures and locks the lever arm in that locked position and such locking mechanism can be a spring located intermediate the lever arm and the hook plate having the hooks formed therein and that spring may be integrally formed with the lever arm or can be a separately attached spring component. The spring action creates an over the center arrangement that locks the lever arm in the desired position. The use of the spring is advantageous, since if the lever arm and a solid hook were used, due to the manufacturing tolerances, the lever arm might nest before it reaches its furthest or lowest position. As such the use of the spring action allows normal tolerances to be used in the construction of the mechanism and the handle will always be pushed down to its lowest, flush position.

Due to the steep angle of the forward edge of the slots, a lot of motion of the hook plate in the downward direction results in only slight inward movement of the receiver housing toward the side rail. This means that less downward force is required to produce a substantial compressive force drawing the pins and the hooks together and results in a very secure, tight connection therebetween. In addition, the weight of the bedding, including the box spring and mattress will add to the downward force to even better affix the side rail to the headboard or footboard. Thus, the more downward force on the hooks being forced against the pins, the more integral the connection becomes between the side rails and the headboard or footboard.

The receiver housing can be inset into a wooden headboard or footboard, that is, it can be fitted into a recess formed in the footboard or headboard, or can be surface mounted to a wooden or metal headboard or footboard or may be by affixed to a headboard or footboard by means of a bracket that is affixed to the headboard or footboard. Similarly, the hook plate may be inset and thereby fitted into a recess formed in the end of a wooden side rail or may be mounted externally thereto and can be affixed to the wooden or rolled metal side rail. In the event the hook plate is used with a metal side rail, there is also a cosmetic plastic cover that fits over the metal hook plate to cover the connection between the side rails and the headboard or footboard.

Other features of the overall bed frame construction will become more apparent in light of the following detailed description of a preferred embodiment thereof and as illustrated in the accompanying drawings.

BRIEF DESCRIPTION OF THE DRAWINGS

FIG. 26 is an exploded view of a further embodiment of the present invention; and FIG. 27 is a side view of a component of the FIG. 26 embodiment with a protective cover in place.

DETAILED DESCRIPTION OF THE INVENTION

Figure 1:
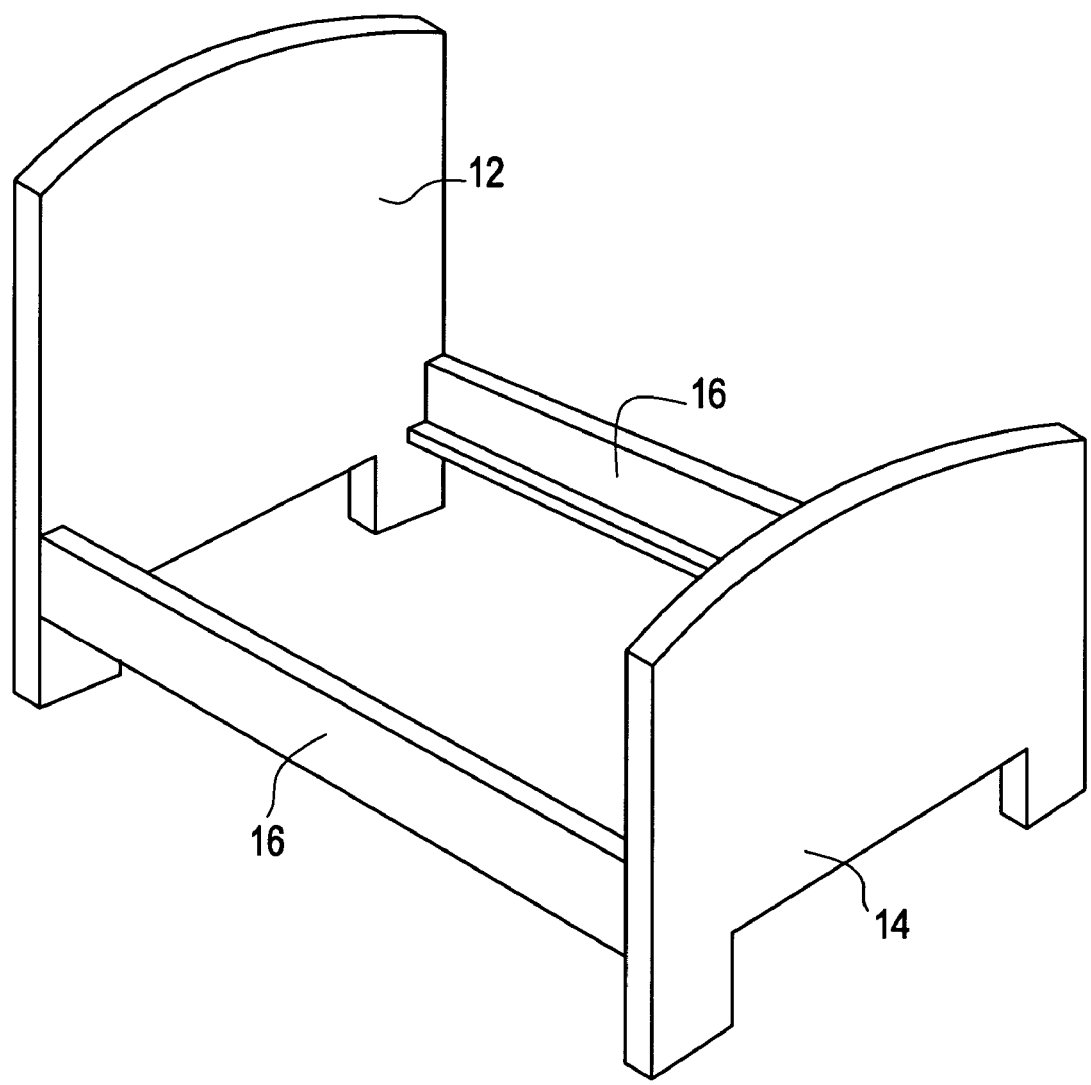
FIG. 1 is a perspective view of a typical bed frame with which the present invention can be utilized.

Referring now to FIG. 1, there is shown a perspective view of a bed frame and which comprises a headboard 12, a footboard 14 and a pair of side rails 16. The side rails are joined to the headboard 12 and footboard 14 so as to complete the bed frame. As can be seen, it is important that the junction between the side rails 16 and the headboard 12 and footboard 14 be a firm affixation so that the overall structure is solid and does not rock. The rocking motion between the various bed frame components contributes to the further loosening of the junctions so it is very important that each junction between the side rails 16 and the headboard 12 and footboard 14 be constructed so as to minimize the rocking effect.

Figure 2:
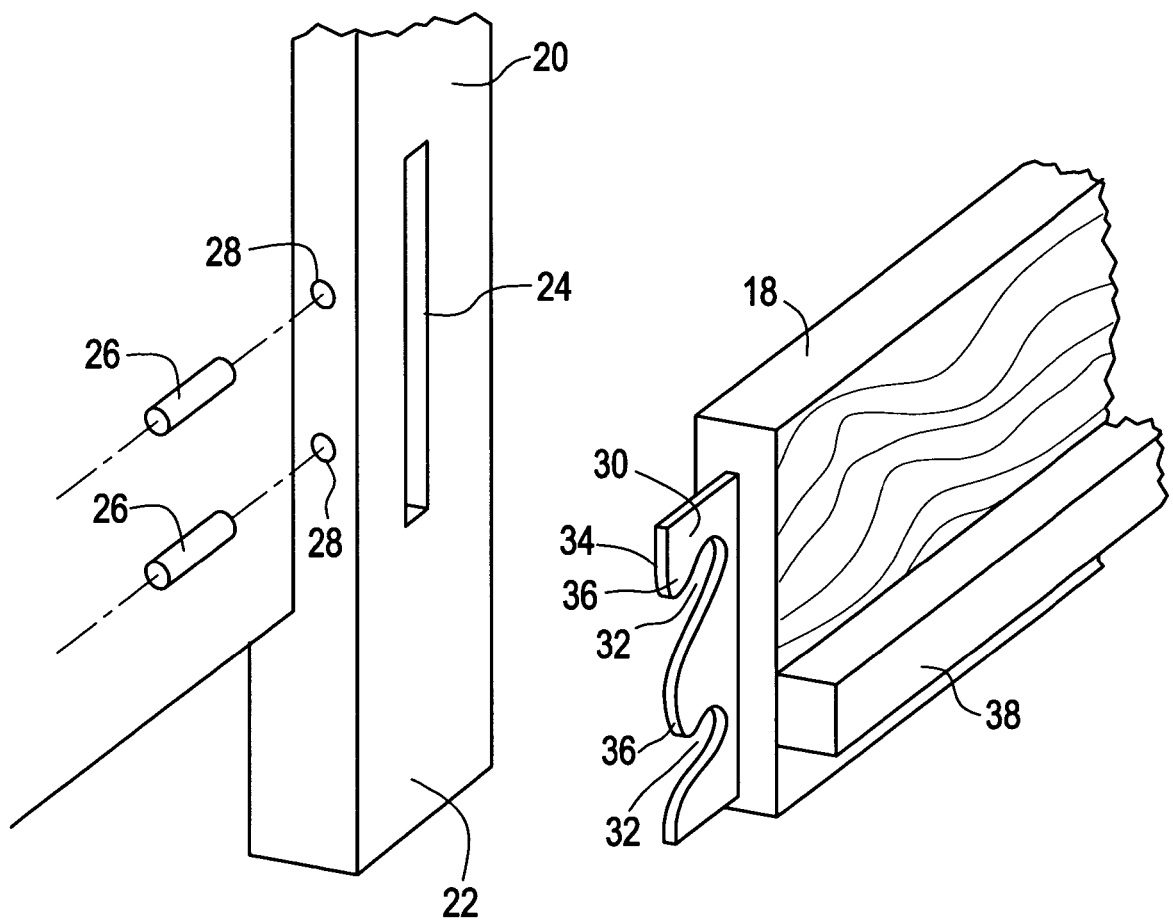
FIG. 2 is an exploded view of a conventional wooden side rail and headboard and illustrating the connection therebetween.

Accordingly, turning to FIG. 2, there is shown an exploded perspective view of a junction between a wooden side rail 18 and a headboard 20. In FIG. 2, it can be seen that the headboard 20 includes a vertical leg 22 that also serves as a main structural component of the headboard 20 and there is a vertically aligned elongated opening 24 in the vertical leg 22. A pair of pins 26 are mounted to the vertical leg 22 through holes 28 so as to extend transversely across the elongated opening 24. Extending longitudinally outwardly from the end of the side rail 18 is a hook plate 30 and which has a pair of slots 32 formed at an angle extending upwardly from the leading edge 34 of the hook plate 30 to form a corresponding pair of hooks 36.

The side rail 18 further includes a support 38 that extends along the length of the side rail 18 to support the box spring and mattress by means of slats that span between the supports 38 on each of the side rails 16 when the bed is assembled. Thus, in the assembly of the bed frame of FIG. 2, the leading edge 34 of the hook plate 30 is inserted into the elongated opening 24 and the hooks 36 are positioned over the pins 26 to complete that junction. By dropping down the side rail 18 so that the pins 26 fit within the slots 32, the junction is completed and is further held by the weight of the box spring and mattress that are later added to the frame. While the junction between the side rail 18 and the headboard 20 is sufficient to hold the components together, the eventual connection is not a firm, solid connection and with the continual use of the bed, the junction becomes loosened and allows the bed to rock and therefore be unstable. Also, as can be seen, the bed frame cannot be physically picked up by lifting on the side rails 18 since the side rails 18 will readily become detached so that two persons cannot readily lift the bed frame by the side rails 18 to move the bed frame to another location.

Figure 3:
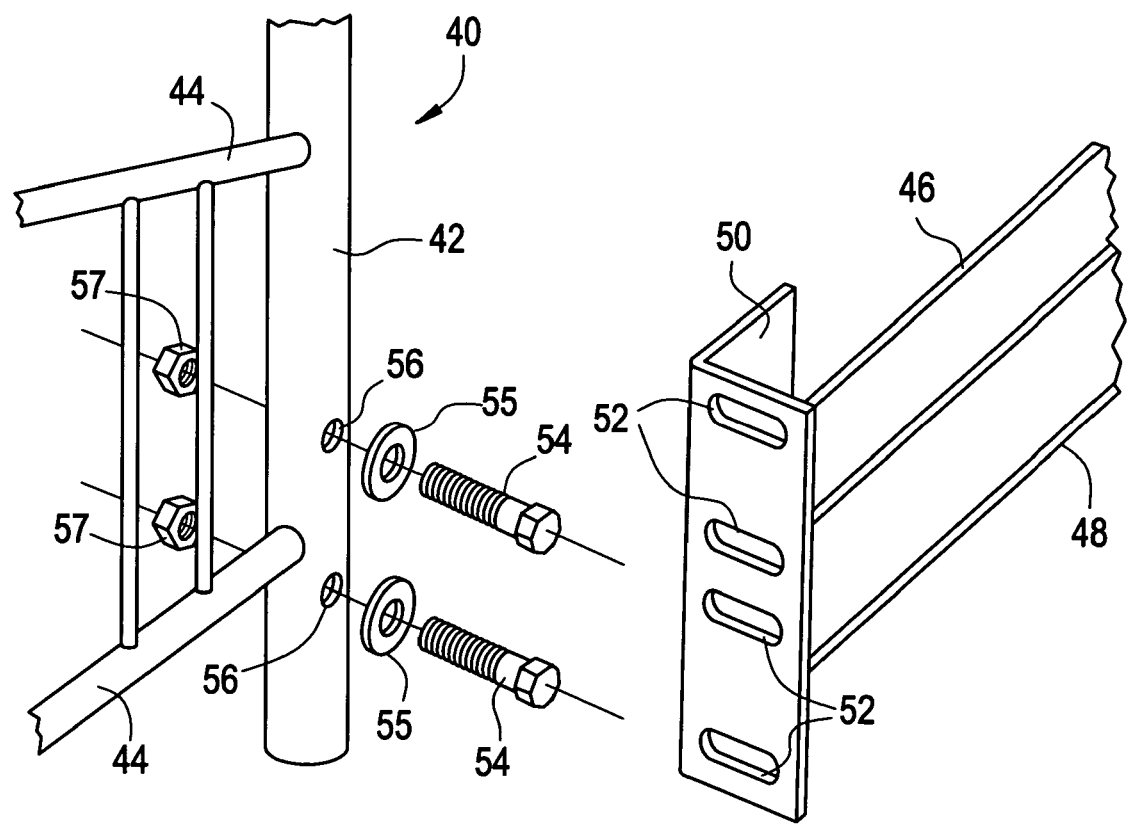
FIG. 3 is an exploded view of a conventional rolled metal side rail and metal headboard and illustrating the connection therebetween.

Turning now to FIG. 3, there is shown an exploded perspective view of a metal headboard 40 having a vertical leg 42 and cross members 44 that provide a decorative feature to the headboard 40. In this embodiment, the angle iron metal side rail 46 also has a support 48 to support the box spring and the mattress and further has a flange 50 that has a plurality of elongated openings 52. Therefore, in the assembly or completion of the junction between the angle iron metal side rail 46 and the metal headboard 40 there are a pair of bolts 54 that pass through the elongated openings 52 where there is some adjustability, through washers 55 and then through holes 56 in the vertical leg 42 and secured by nuts 57 to secure the angle iron metal side rail 46 to the metal headboard 40. Again, the type of junction shown in FIG. 3 is likely to come loose over time and allow the rocking of the completed bed over time.

Figure 4:
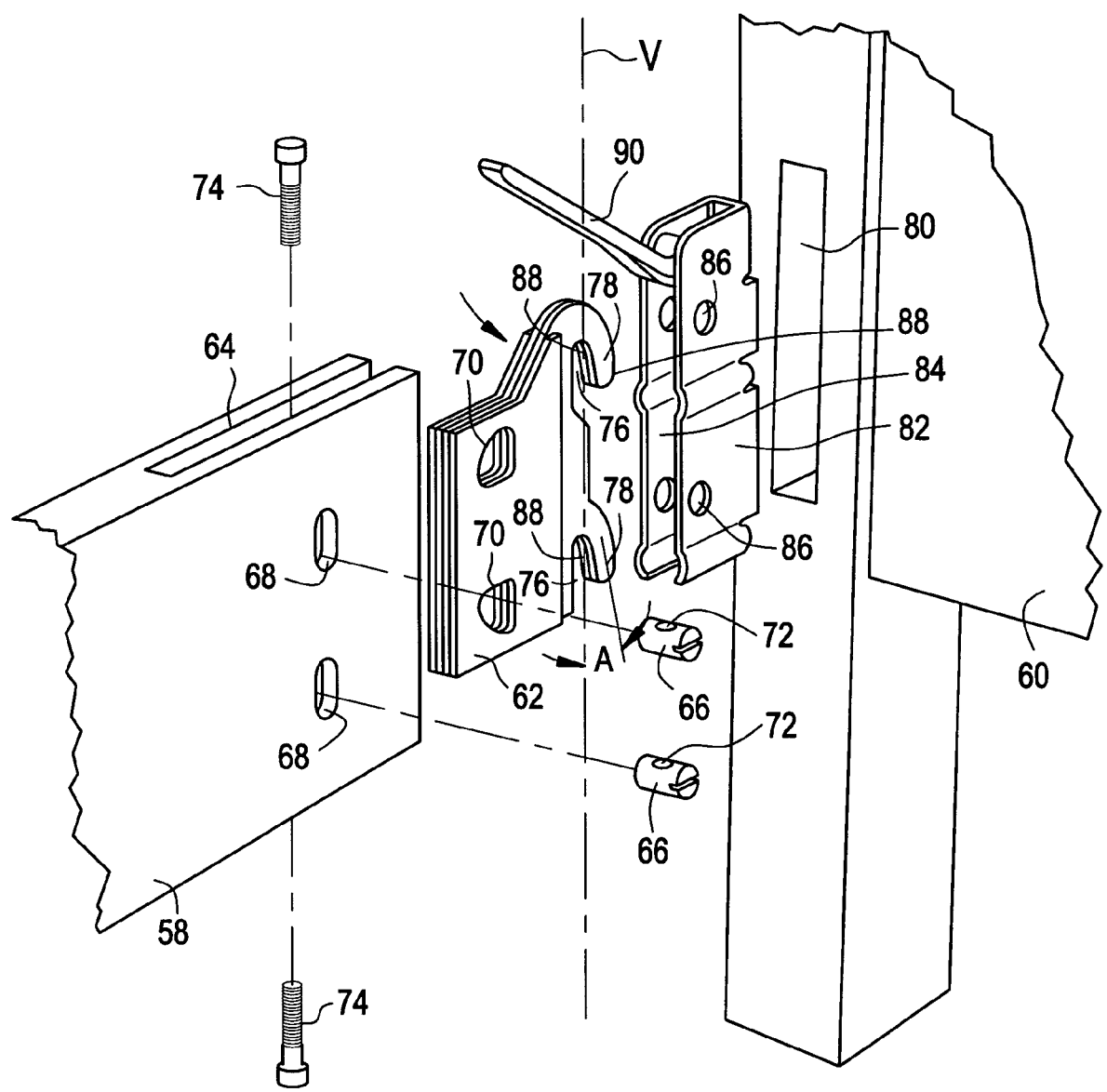
FIG. 4 is an exploded perspective view of a side rail connection system constructed in accordance with the present invention.

Next, turning now to FIG. 4, there is shown an exploded perspective view of a side rail connection system constructed in accordance with the present invention. In FIG. 4, the system is illustrated in connection with a wooden side rail 58 and a wooden headboard 60. With the wooden side rail 58, there is a hook plate 62 that extends longitudinally outwardly from the end of the wooden side rail 58. In this embodiment, the hook plate 62 is comprised of a plurality of individual metal plates that are laminated together. The hook plate 62 fits into a vertically oriented recess 64 formed in the wooden side rail 58 such that the hook plate 62 fits into the recess 64 and is secured therein by means of slugs 66 the are inserted into the vertically elongated holes 68 in the side rail 58 and which also pass through triangular shaped openings 70 in the hook plate 62.

The triangular shaped openings 70 are oriented such that they are right triangles with the hypotenuse sloping upwardly and rearwardly with respect to the lower opening 70 and upwardly and forwardly with respect to the upper opening 70. As such the slugs 66 have threaded holes 72 and screws 74 are provided that are threaded into the threaded holes 72 such that tightening the screws pull the slugs 66 outwardly, that is, the upper slug 66 is pulled upwardly and the lower slug 66 is pulled downwardly, which movement is allowed by the elongation of the vertically elongated holes 68, causing the slugs 66 to move along the hypotenuse of the triangular shaped openings 70 and pull the hook plate 62 inwardly into the recess 64 in the end of the side rail 58 to create a tight, secure connection for the hook plate 62 in the recess 64. At the distal end of the hook plate, there are a pair of slots 76 formed at an angle upwardly and inwardly toward the side rail 58 thereby forming a pair of hooks 78.

Fitted into a vertically oriented elongated recess 80 in the wooden headboard 60 is a receiver housing 82. The receiver housing 82 is a generally U-shaped metal stamping and has an opening 84. The receiver housing 82 is affixed to the wooden headboard 60 by means of wood screws (not shown in FIG. 4). There are two pins 86 that are affixed transversely across the opening 84 and are vertically spaced apart a predetermined distance so as to correspond with the spacing of the hooks 78. Accordingly, as has been explained with respect to FIG. 3, in order to affix the wooden side rail 58 to the wooden headboard 60, the leading edges 88 of the hooks 78 are inserted into the opening 84 in the receiver housing 82 such that the hooks 78 fit over the pins 86. Thus, the pins 86 enter the slots 76 and continue upwardly into the slots 76 as the weight of the side rail 58 and, of course, the further weight of the box spring and mattress, when installed thereto, affixes the wooden side rail 58 to the wooden headboard 60. As also can be seen in FIG. 4, the slots 76 have leading edges 88, that is, the edges that are located forward of the hook plate 62 and thus the leading edges 88 contact the pins 86 and cause the wooden side rail 58 to move toward the wooden headboard 60 as the hook plate 62 moves in the downward direction.

The leading edge 88, as will be later more fully explained, is designed to have predetermined angle with respect to the vertical, represented by the line V, and that angle, shown as angle A, is sloped upwardly and inwardly toward the side rail 58 and is a steeper angle than angle of the leading edge 34 of the hook plate 30 in the conventional construction shown in FIG. 2. The angle A is preferably between about 5 degrees and about 15 degrees and, more preferably, is about 10 degrees. Finally, as is also shown in FIG. 4, there is a lever arm 90 that is pivotally affixed to the receiver housing 82 and can, therefore, pivot about a pivot point on that receiver housing 82 and the purpose and function of the lever arm 90 will also be later explained.

Figure 5:
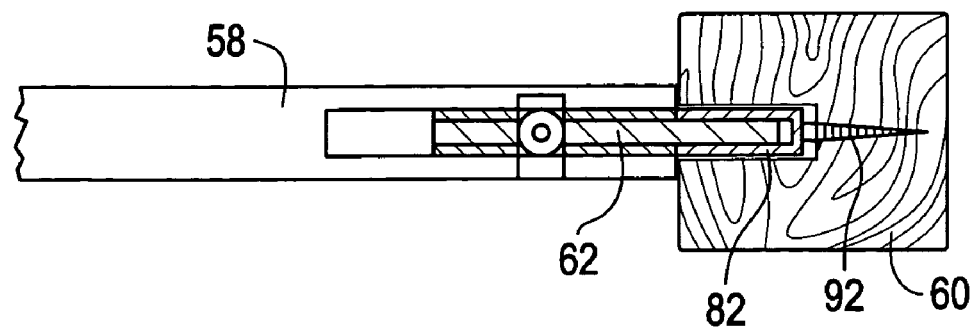
FIG. 5 is a top cross-sectional view of the side rail end connection system of FIG. 4.

Turning now to FIG. 5, there is shown a top cross-sectional view of the side rail end connection system of FIG. 4 and showing the hook plate 62 set into the wooden side rail 58 and showing a typical wood screw 92 that is used to affix the receiver housing 82 to the wooden headboard 60 in a manner that is also recessed into the headboard 60. In this Fig., the lever arm 90 is shown in the closed and locked position.

Figure 6:
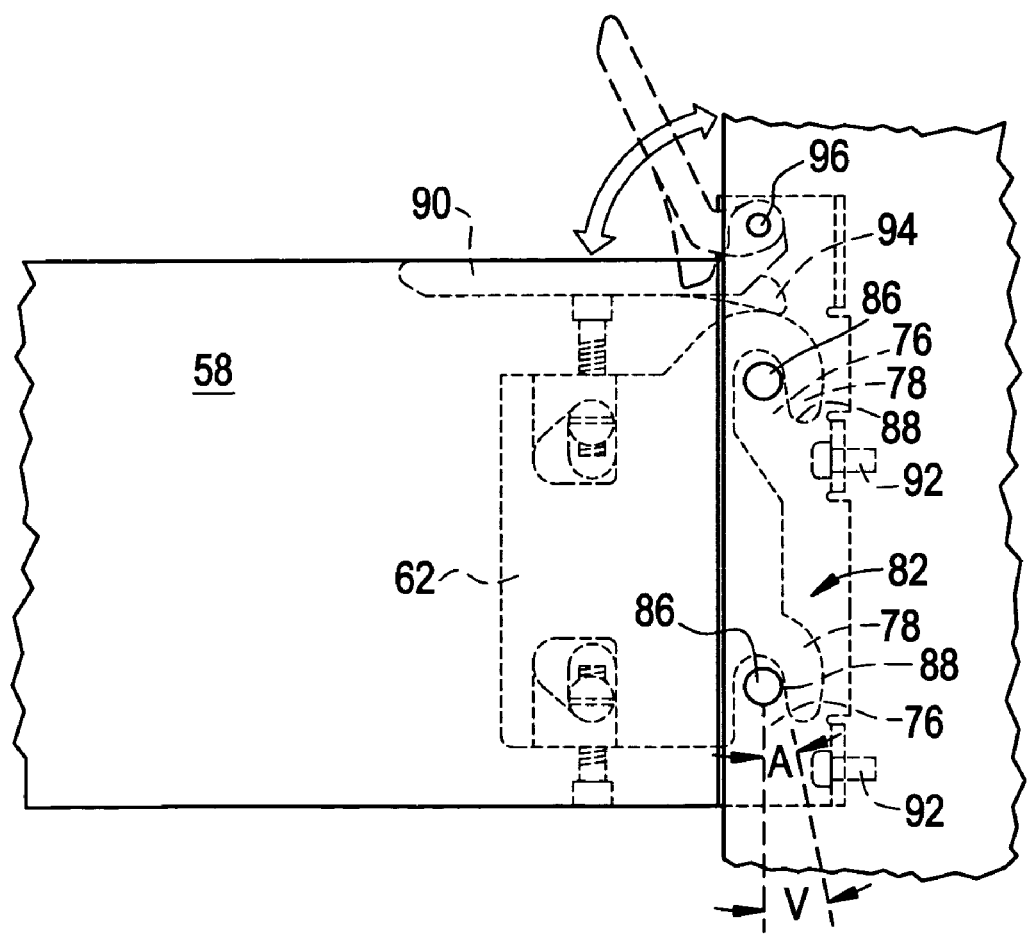
FIG. 6 is a side view, broken away, of the present side rail end connection system.

Turning now to FIG. 6, there is shown, a side view, broken away, of the present side rail end connection system and illustrating the location of the receiver housing 82 and its relationship to the hook plate 62 when the two components are securely affixed together. In FIG. 6, the lever arm 90 is shown in the solid line, locked position where the hook plate 62 and, of course, the side rail 58 is locked to the receiver housing 82 and, of course, the wooden headboard 60 and in the dotted line position where those components are not locked together. In the connection, therefore, as stated, the hooks 78 are initially positioned over the pins 86 so that the pins 86 enter the angled slots 76 and engage the leading edges 88 of those slots 76. Thus the weight of the wooden side rail 58 acts downwardly and causes the hooks 78 to firmly engage the pins 86 along that leading edge 88.

An additional force is added to the force created by the weight by means of the lever arm 90 that is pivoted by the user from its dotted line position to its solid line position and causes a spring 94 that extends downwardly from the lever arm 90 to engage the upper surface of the hook plate 62 and further force the hook plate 62 downward by the lever action of the lever arm 90 pivoting about the pivot point 96 on the receiver housing 82. Accordingly, the user can better solidify the connection between the wooden side rail 58 and the wooden headboard 60 simply by pivoting the lever arm 90 so as to contact the upper surface of the hook plate 62 to drive that hook plate 62 in the downward direction to more strongly force together the leading edge 88 of the slots 76 of hooks 78 and the pins 86.

Due to the steepness of the angle A of the leading edge 88, considerable leverage can be achieved with the lever arm 90 as it forces the hook plate 62 downwardly and the leading edge 88 of the slot 76 is forced downward to better secure the side rail 58 to the wooden headboard 60. As can be noted in FIG. 6, when the side rail 58 is locked into the secured position, the pins 86 are seated against the leading edge 88 of the slot 76 and do not reach to uppermost point of the slot 76.

The spring 94 depends downwardly from the lever arm 90 and is resiliently biased thereto and provides a locking action to the lever arm 90 so that the lever arm 90 can be retained in the locked position as shown in the solid line position of FIG. 6. Accordingly, as the lever arm 90 progresses from its dotted line position to its solid line position, the spring 94 contacts the upper surface of hook plate 62 and moves upward toward the lever arm 90 against the spring bias. As the lever arm 90 progresses further, the spring 94 physically passes the highest point of the upper surface of the hook plate 62 and then springs downwardly in an over the center action the retains the lever arm 90 in the solid line position, thereby locking the side rail 58 to the headboard 60.

Figure 7:
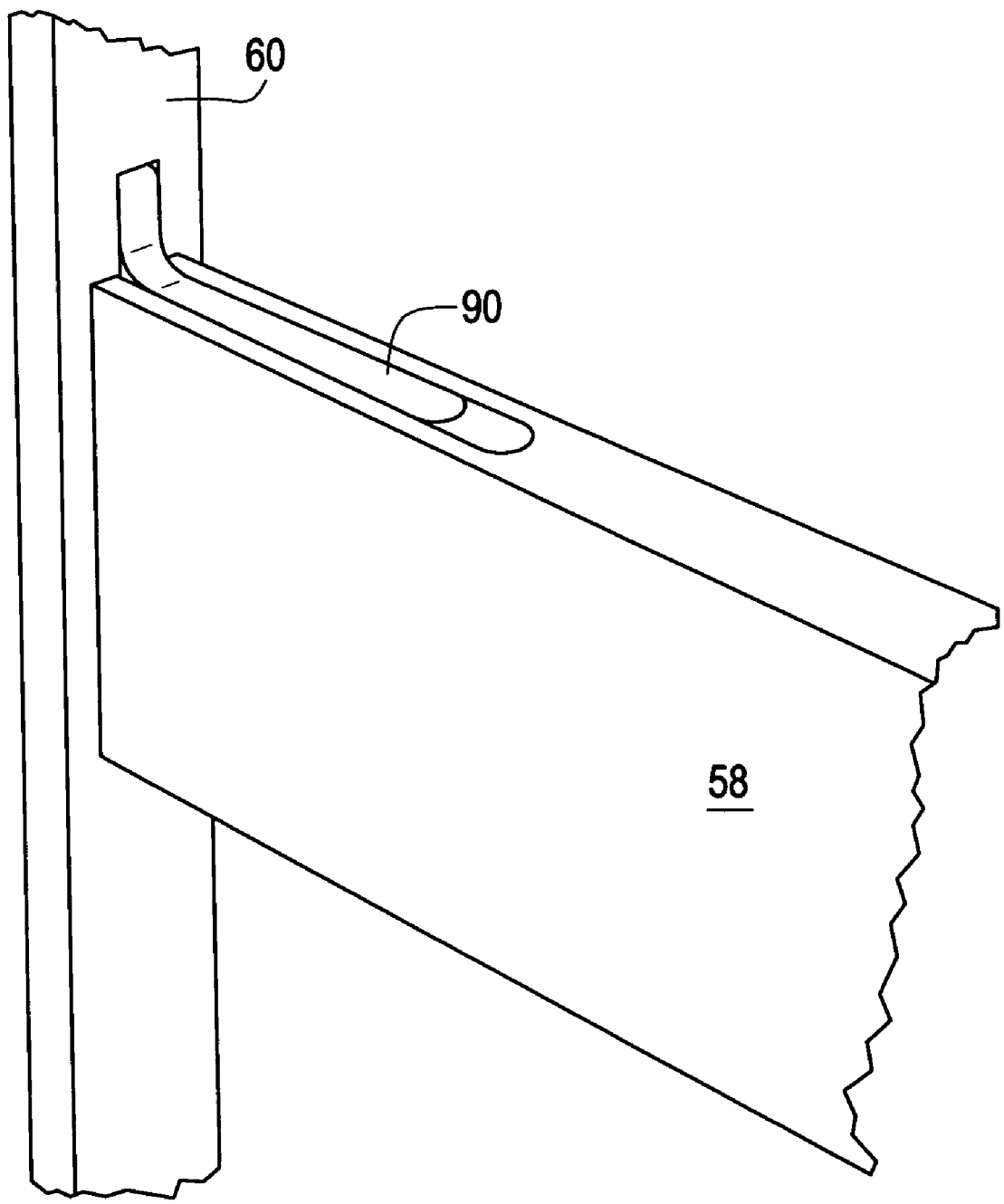
FIG. 7 is a perspective view of a completed side rail assembly constructed in accordance with the present invention.

Turning now to FIG. 7, there is shown a perspective view of a completed side rail assembly and illustrating the lever arm 90 in its locked position where it is located flush with the upper surface of the wooden side rail 58 and which thereby covers the screw 74 (FIG. 6) that affixes the hook plate 62 to the wooden side rail 58.

Figure 8:
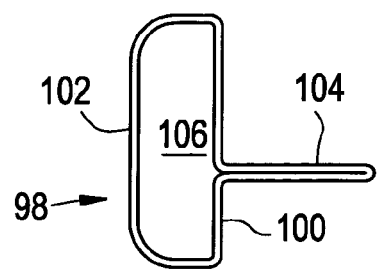
FIG. 8 is an end view of a metal form of side rail known as a rolled side rail.

Next, taking FIG. 8, there is an end view of a metal form of side rail known as a rolled side rail 98 and is basically a steel rolled form of side rail having a flat, inside vertical portion 100 and an outer, somewhat arcuate portion 102. A flat planar support 104 extends inwardly toward the center of the bed frame and which supports the box spring and the mattress. As can be seen, there is an internal space 106 within the rolled side rail 98.

Figure 9:
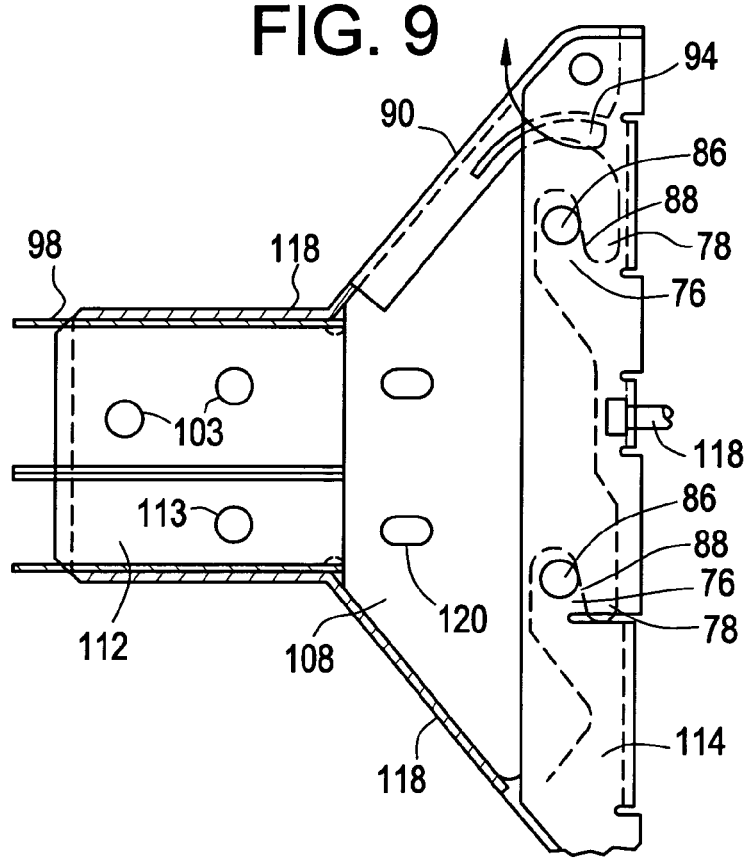
FIG. 9 is a side cross sectional view of a side rail end connection system constructed in accordance with the present invention.
Figure 10:
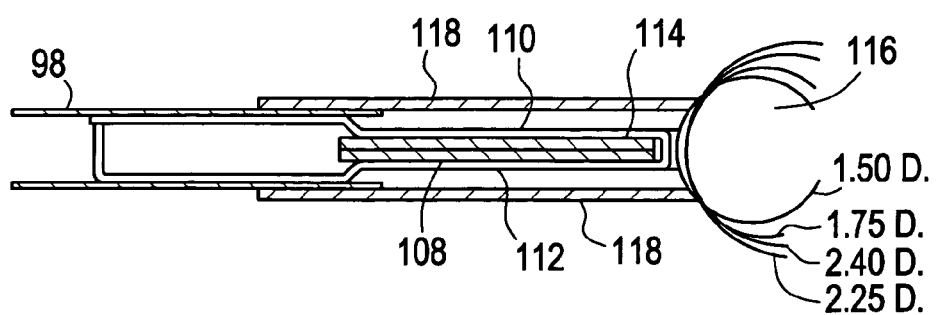
FIG. 10 is a top cross sectional view of the side rail end connection system of FIG. 9.

Accordingly, turning now to FIGS. 9 and 10, taken in conjunction with FIG. 8, there is shown a side cross sectional view and a top cross sectional view, respectively, of a side rail end connection system constructed in accordance with the present invention and adapted to be used with the rolled side rail 98. In the construction, there are two flat steel components laminated together to form the hook plate 108 and which, in turn, is sandwiched between a pair of support plates 110 and 112. The support plates 110 and 112 extend inwardly into the internal space 106 of the rolled side rail 98 and are welded to the inside vertical portion 100 and the outer portion 102, respectively, of the rolled side rail 98. The weld itself can be accomplished by providing a few holes 113 in both the inside vertical portion 100 and the outer portion 102 and laying the weld material within the holes and onto the surface of the support plates 110 and 112 that are located just internal of the rolled side rail 98.

In this embodiment, the receiver housing 114 is affixed to the headboard post 116 by means such as screws 118 that can be screwed into captive nuts (not shown) secured to the headboard post 116 of the screws 118 may pass entirely though the headboard post 116 and be held by nuts (not shown) that are located at the rear of the headboard post 116. In any event, the screws 118 hold the receiver housing 114 securely to the headboard post 116 in a surface mounted position as opposed to the inset position with a wooden headboard as shown in the previous FIGS. 4 to 7.

In other respects, the use and operation of the present invention with rolled side rails 98 is similar to the embodiment used with wooden component and like identification numbers are used for the corresponding components of FIGS. 4 to 7, such as the leading edges 88 of the slots 76 forming the hooks 78 that fit over the pins 86 to affix the rolled side rail 98 to the headboard post 116. Again, by moving the lever arm 90 to the position shown in FIG. 9, the spring 94 contacts and forces the hook plate 108 downwardly to force the leading edge 88 firmly against the pins 86 and hold the rolled side rail 98 to the headboard post 116.

In the FIGS. 9 and 10 embodiment, there is also a plastic cover 118 that is affixed to the hook plate 108 and may be affixed thereto by fasteners that pass through elongated holes 120 in the hook plate 108 and the support plates 110 and 112.

Figure 11:
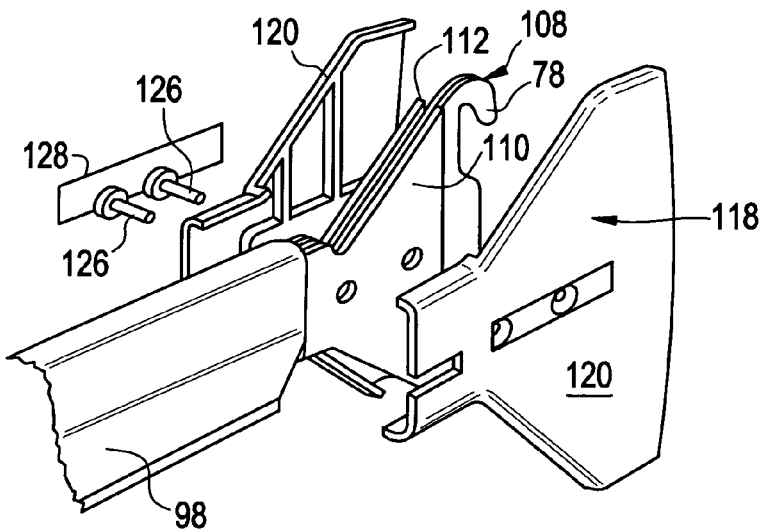
FIG. 11 is an exploded view, of the side rail connection system of FIG. 9.
Figure 12:
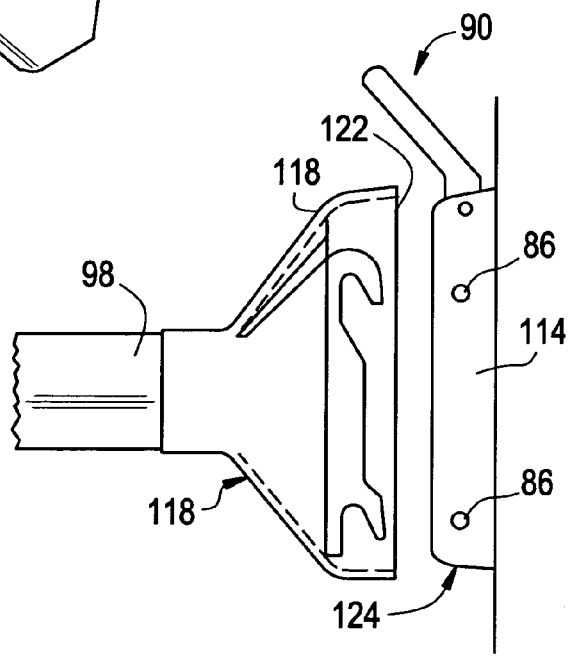
FIG. 12. Is a side view of the side rail connection system of FIG. 9.
Figure 13:
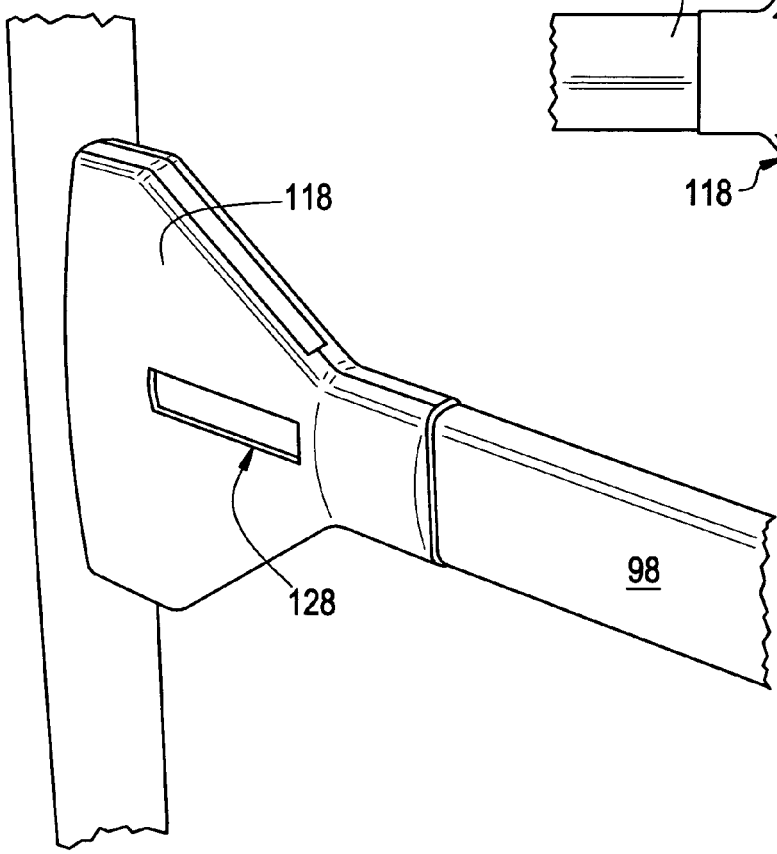
FIG. 13 is a perspective view of the side rail connection system of FIG. 9.

In FIGS. 11–13, there can be seen an exploded view, a side view and a perspective view, respectively of the bed frame assembly of FIGS. 9 and 10 with the plastic cover 118 that is affixed thereto. As shown in FIG. 11, the plastic cover 118 can comprise two half sections 120 that span each side of the support plates 110, 112 and, of course, the hook plate 108. The plastic cover 118 preferably extends to the end of the support plates 110, 112 thus leaving the hooks 78 extending therefrom so that the hooks 78 enter the receiver housing 114 and the hooks 78 fit over the pins 86. By that orientation, the distal edge 122 of the plastic cover 118 can abut against a further plastic housing 124 of the receiver housing 114 and provide a clean, uniform profile and outward appearance of the overall end connection system and is specifically shown in the perspective view of FIG. 13. The connecting of the respective two half sections 120 can be by means of the screws 126 and covered by strip 128 to cover the heads and nuts of the screws 126, unless captive nuts are utilized or one of the half sections 120 has a threaded connection molded therein.

Figure 14:
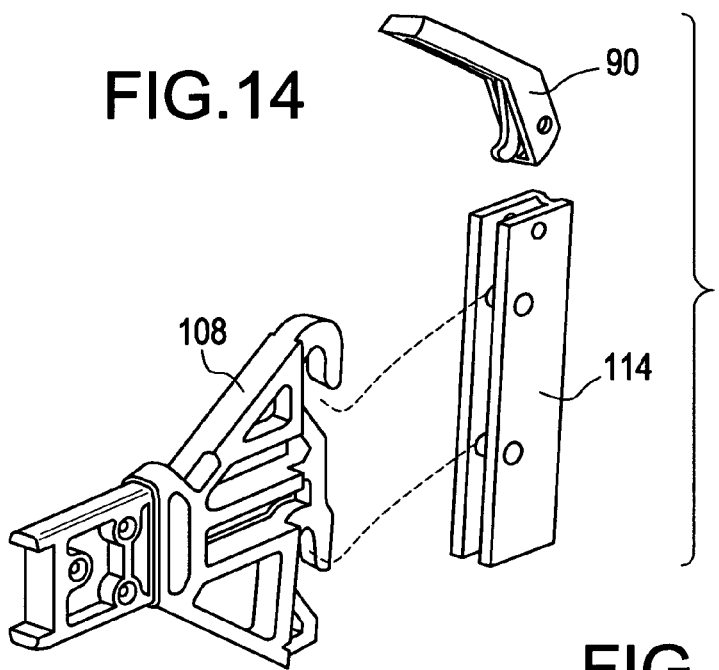
FIG. 14 is an exploded view of a further embodiment of the present invention.
Figure 15:
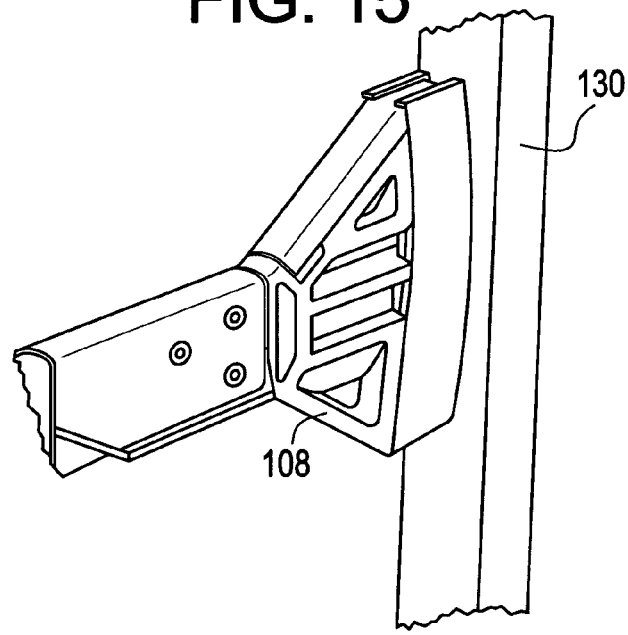
FIG. 15 is a perspective view of the embodiment of FIG. 14.
Figure 16:
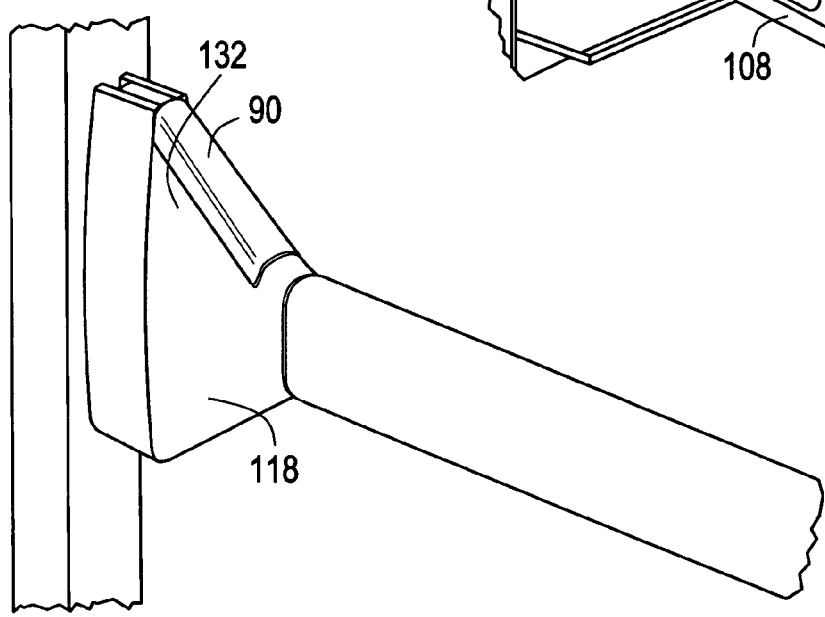
FIG. 16 is a further perspective view of the FIG. 14 embodiment.

Turning now to FIGS. 14–16, there is shown an exploded view, a perspective view and a further perspective view of the side rail connection system of the present invention with the plastic cover 118 affixed thereto and wherein the hook plate 108 is a metal casting as opposed to the use of metal plates sandwiched together. As can be seen, again the receiver housing 114 is surface mounted to the particular headboard 130 which may be wooden or metal and the hook plate 108 is made of a one piece cast metal construction. As in the prior embodiment, the plastic cover 132 covers the hook plate 108 and gives the assembly a pleasing outward appearance.

Figure 17:
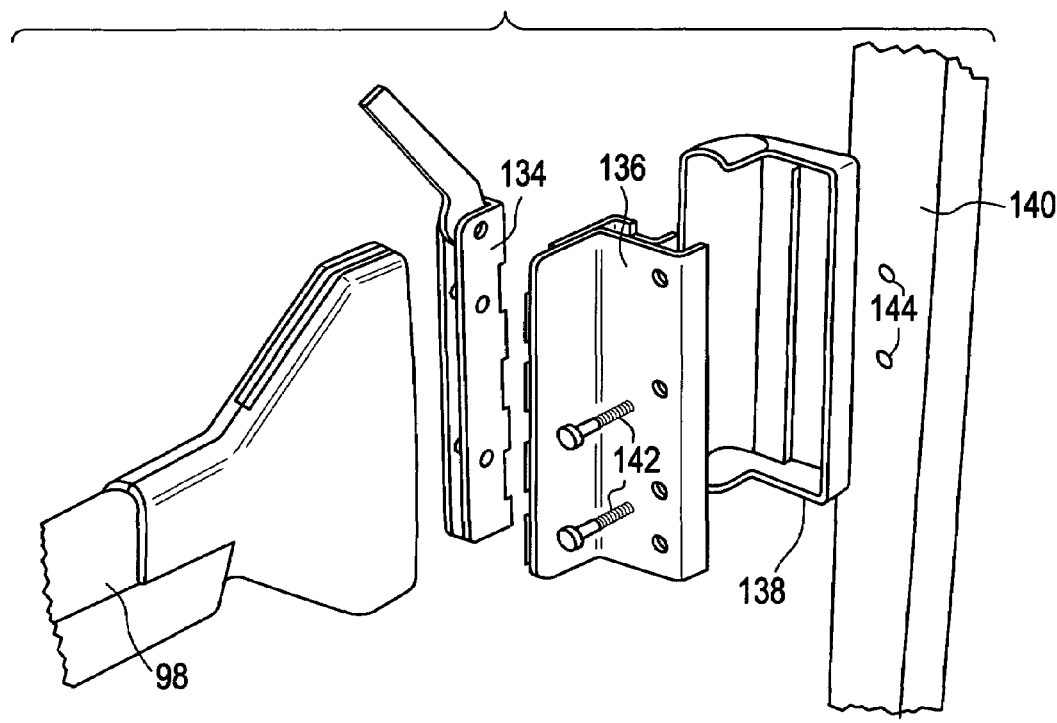
FIG. 17 is an exploded view of a still further embodiment of the present invention.
Figure 18:
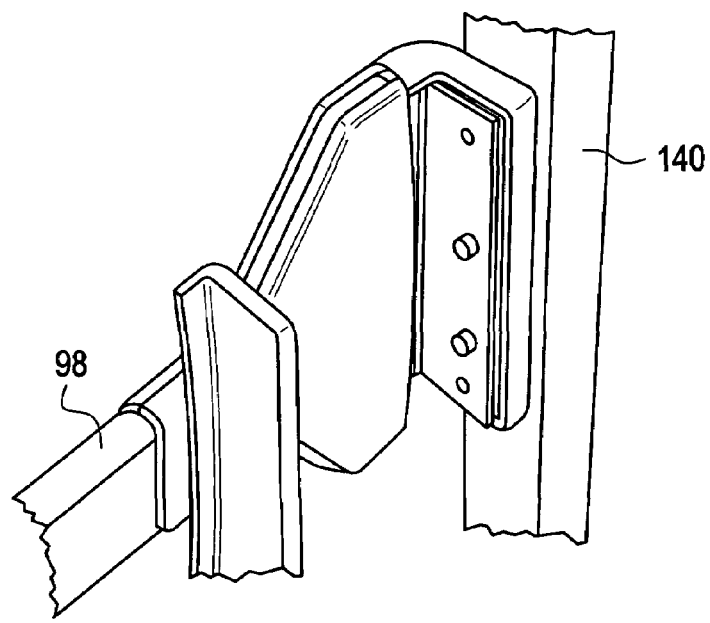
FIG. 18 is a perspective view of the embodiment of FIG. 17.

Turning, next, to FIGS. 17 and 18, there is shown an exploded view and a perspective view of the side rail connection system of the present invention and illustrating a further embodiment where the receiver housing 134 is a different construction and is affixed to an offset flange 136 that is, in turn, affixed to mounting housing 138 that can be fastened to the head board 140 by means such as screws 142 that enter the holes 144 in the head board 140. By use of the offset flange 136, the width of the box spring and mattress can be widened and still the system can lock the side rail 98 to the headboard 140. As such, a wider box spring and mattress can be used than normally designed for a particular bed frame with the use of the offset flange 136.

Figure 19:
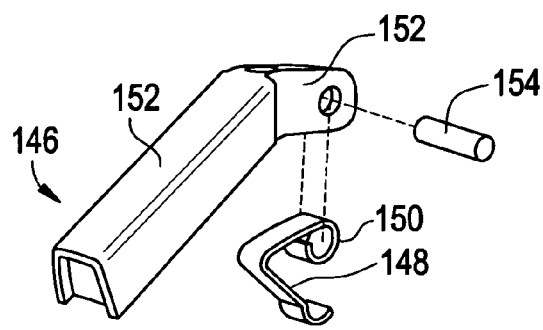
FIG. 19 is an exploded view of a lever arm that can be used with the present invention.
Figure 20:
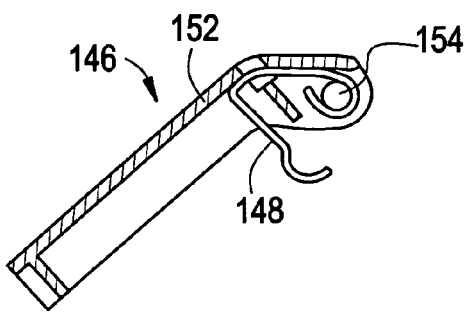
FIG. 20 is a side cross sectional view of the lever arm of FIG. 19.

In FIGS. 19 and 20, there is shown an exploded view and a side cross-sectional view of a lever arm 146 that can be used with the present invention. In this embodiment, the spring 148 is a separate component that is generally U-shaped and which has a rounded end 150 that can be affixed to the lever arm housing 152 and held thereto by a pin 154 when the lever arm 146 is assembled. In this embodiment, the lever arm housing 152 can be a cast metal construction or a stamping.

Figure 21:
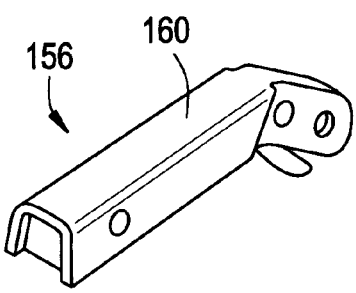
FIG. 21 is a perspective view of a further lever arm that can be used with the present invention.
Figure 22:
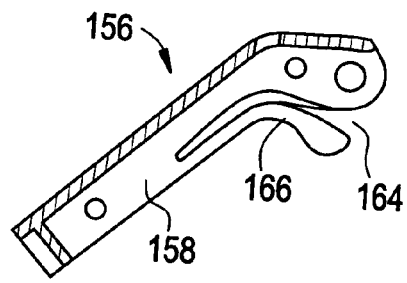
FIG. 22 is a side cross sectional view of the lever arm of FIG. 21.
Figure 23:
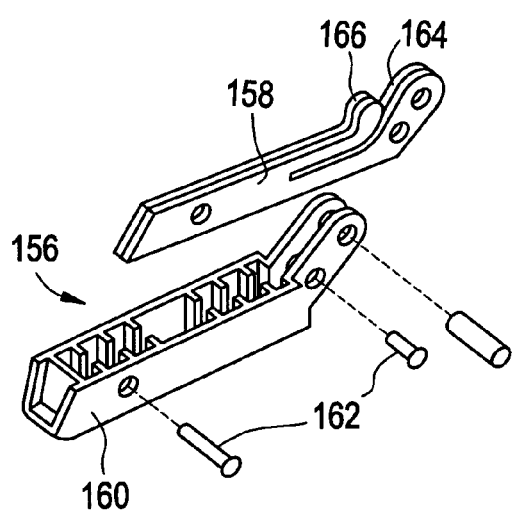
FIG. 23 is an exploded view of the lever arm of FIG. 21.

In FIGS. 21–23, there are shown a perspective view, a side cross sectional view and an underside exploded view, taken from beneath, of a further embodiment of a lever arm 156. In this embodiment, the lever arm 156 comprises a pair of tempered steel blades 158 that are affixed together and a plastic cover 160 that is affixed to the exterior of the steel blades 158 by means such as rivets 162. The steel blades 158 have an elongated opening 164 forming a downwardly extending spring 166 that serves the same purpose as the separate spring 148 of the FIGS. 19 and 20 embodiment.

Figure 24:
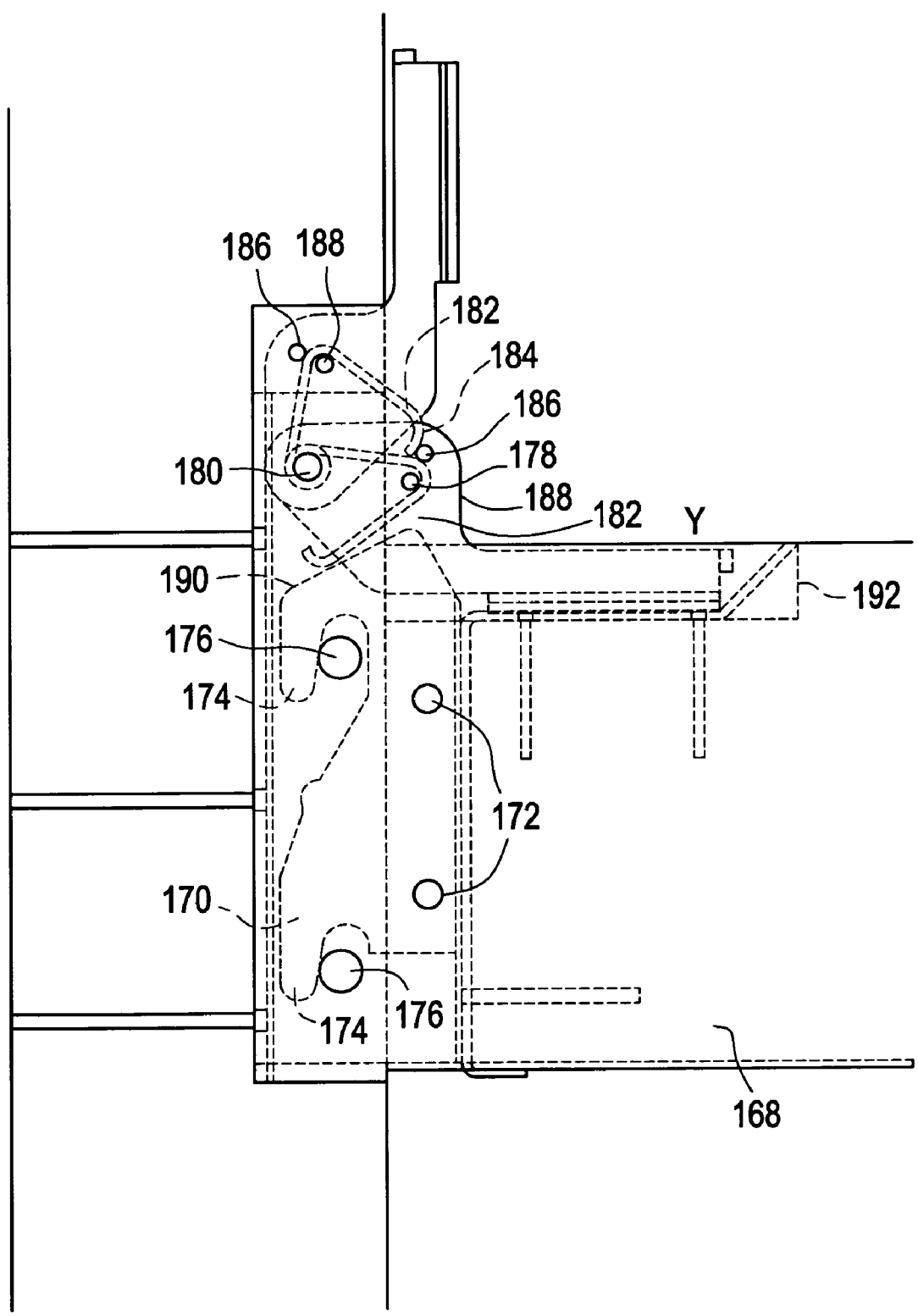
FIG. 24 is a side cross sectional view of a still further embodiment of the present invention.
Figure 25:
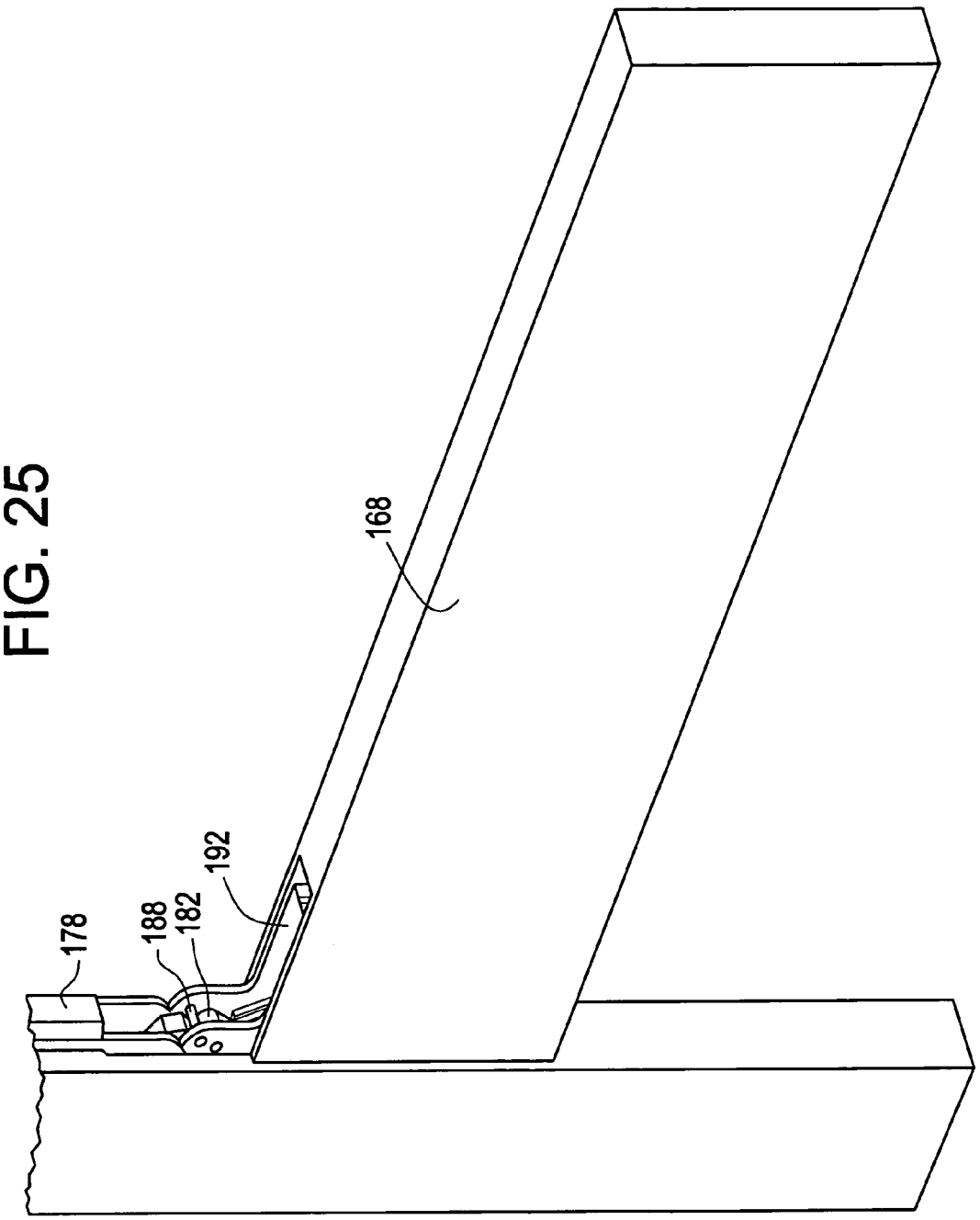
FIG. 25 is a perspective view of the embodiment of FIG. 24

Turning to FIGS. 24 and 25, there is shown a side cross sectional view and a perspective view of the present invention and showing a wooden side rail 168 having a hook plate 170 affixed thereto by means such as screws 172 such that the hooks 174 extend outwardly and overlap the pins 176 as described with reference to the prior embodiments. With this embodiment, the lever arm 178 is shown in its upper, unlocked position at X and its lowered, locked position at Y. The lever arm 178 is thus pivoted about pivot point 180 between the X position and the Y position. In the X position there a heavy spring 182 encircles the pivot point 180 and generally forms a right angle having a distal end 184. The spring 182 is held in position by a pair of pins 186, 188.

Accordingly, as the lever arm 178 is lowered from position X to position Y, the spring 182, at or near its distal end 184 contacts the upper surface 190 of the hook plate 170 and pushes the hook plate 170 downwardly. In the downward movement of the lever arm 178, the pin 186 holds the spring in its proper position and the pin 188 holds the spring 184 in position when the lever arm 178 is returning from the Y position back to the X position. The lever arm 178 fits within recess 192 in the wooden side rail 168 in the lowered, locked position to as to remain flush with the upper surface of that side rail 168.

Turning finally to FIGS. 26 and 27, there is shown, respectively, an exploded view of a still further embodiment of the present invention and a side view of the side rail of the FIG. 26 embodiment with a protective cover in place. As can be seen, therefore, the angle iron side rail 194 is, in this embodiment, a T-shaped configuration that is formed by the joining together of two L-shaped angler irons 196, 198 to create a double length of vertical side 200 and a horizontal side 202 extending therefrom.

The end of the horizontal side 202 has a hole 204 formed therein and the vertical side 200 has a pair of holes 206, one above and one below the horizontal side 202. The use of the holes 204, 206 will be later explained.

The hook plate 208 is, again, like the FIG. 4 embodiment, comprised of a plurality of individual metal plates that are laminated together and one of such metal plates has a horizontal extension 210 that extends outwardly along the lateral side of the hook plate 208 at or proximate to the proximal end 212 of the hook plate 208. At the distal end 214 of the hook plate 208, there are formed a pair of slots 216 (only one of which is shown in FIG. 26) thereby forming a pair of hooks 218.

The are also a pair of holes 220 formed in a horizontal direction or plane at or near the proximal end 212 of the hook plate 208 and there is a further hole 222 that is in a vertical direction formed in the horizontal extension 210. A slot 224 is also formed in the proximal end 212 of the hook plate 208 just beneath the horizontal extension 210.

Accordingly, to affix the hook plate 208 to the side rail 194 in constructing the overall device, the side rail 194 is aligned with the hook plate 208 such that the hole 204 in the horizontal side 202 aligns with the hole 222 in the horizontal extension 210 and the holes 206 in the vertical side 200 align with the holes 220 in the proximal end 212 of the hook plate 208. In making that alignment of the multiple holes, the horizontal side 202 of the side rail 194 enters the slot 224.

To complete the assembly, rivets 226 are used to pass through the respective holes to solidly affix the hook plate 208 to the side rail 194 and, the affixation takes place along both the horizontal and vertical planes, thereby providing an extra sturdy connection therebetween.

As can also be seen, there can be plastic covers 228 that are affixed to the hook plate 208 and may be affixed thereto by rivets 230 passing through holes 232 in the hook plate 208 and holes 234 in the plastic cover 228 with the heads of the rivets 230 covered by a cover strip 236.

In addition, to complete the assembly to provide a pleasing look to the completed product as well as to provide a safety feature, there is shown a snap on protective member 238, best shown in FIG. 27 and which snaps on to the vertical side 200 of the side rail 194. The snap on protective member is of the type shown and described in U.S. patent application Ser. No. 09/997,389, filed Nov. 29, 2001, entitled "Snap On Protective Members For Bed Frames" and the disclosure of that patent application is hereby incorporated herein in its entirety by reference.

Thus, it can be see that the hook plate 208, having been affixed to the side rail 194 along two planes, that is, the vertical and horizontal planes are more firmly affixed together and resist twisting and the like and the construction can be used in conjunction with the embodiment of the present invention shown in FIGS. 9 and 10.

While the present invention has been set forth in terms of a specific embodiment or embodiments, it will be understood that the side rail end connector system herein disclosed may be modified or altered by those skilled in the art to other configurations. Accordingly, the invention is to be broadly construed and limited only by the scope and spirit of the claims appended hereto.

We claim:

1. A bed frame assembly comprising a pair of side rails and a headboard, each of said side rails having a hook plate affixed thereto, said hook plate having at least one hook formed in said hook plate and extending longitudinally outwardly from said side rails, a receiver housing affixed to said headboard, said receiver housing having a vertically aligned opening and having at least one pin transversely mounted across said at least one opening, said at least one hook forming a slot having a forward edge toward said headboard and having a predetermined angle, said at least one hook adapted to be insertable into said opening of said receiver housing and to fit over said at least one pin wherein said at least one pin enters said slot to affix said side rail to said headboard, and a locking mechanism, said locking mechanism comprising a lever arm pivotally affixed to said receiver housing, said lever arm adapted to engage said hook plate, said lever arm being pivotable to push said hook plate downwardly to force said at least one pin and said forward edge of said slot forcefully together, said locking mechanism operable to lock said lever arm in a locked position holding said at least one pin forcefully against said forward edge of said slot.

2. A bed frame assembly as defined in claim 1 where said at least one hook comprises two hooks and said at least one pin comprises two pins.

3. A bed frame assembly as defined in claim 1 wherein said predetermined angle of said forward edge of said slot is between about 5 degrees and 15 degrees with respect to the vertical.

4. A bed frame assembly as defined in claim 3 wherein said predetermined angle of said forward edge of said slot is about 10 degrees.

5. A bed frame assembly as defined in claim 1 wherein said hook plate is formed by laminated metal plates having a pair of hooks formed in the laminated metal plates.

6. A bed frame assembly as defined in claim 5 wherein said assembly further includes a protective cover surrounding said laminated metal plates.

7. A bed frame assembly as defined in claim 1 wherein said hook plate is formed of a cast metal.

8. A bed frame assembly as defined in claim 1 wherein said lever arm includes a spring, said spring adapted to engage said hook plate and to be moved to an over the center position where said spring holds said lever arm in the locked position.

9. A bed frame assembly as defined in claim 8 wherein said spring is a separable component that is affixed to said lever arm.

10. A bed frame assembly as defined in claim 8 wherein said spring is formed integral with said lever arm and depends downwardly therefrom.

11. A bed frame assembly as defined in claim 1 wherein said headboard is made of wood and said receiver housing in inset into an opening in said headboard.

12. A bed frame assembly as defined in claim 1 wherein each of said side rails is made of wood and said hook plate is inset into an opening in said side rail with said hooks extending outwardly therefrom.

13. A bed frame assembly as defined in claim 1 wherein each of said side rails is made of rolled steel having an internal space and said hook plate is inserted into said space in said rolled steel side rail.

14. A bed frame assembly as defined in claim 13 wherein said hook plate is sandwiched between a pair of support plates, and said support plates are welded to said rolled steel side rail.

15. A bed frame assembly as defined in claim 1 wherein said lever arm comprises a plurality of steel blades forming said at least one hook and a plastic cover enclosing said steel blades.

16. A locking mechanism for use in affixing a side rail of a bed frame to a headboard, said locking mechanism comprising a hook plate, said hook plate adapted to be affixed to a side rail of a bed frame and having a pair of hooks, vertically spaced apart, extending longitudinally outwardly from said side rail, said hooks being formed so as to have a slot having a forward edge disposed at a predetermined angle with respect to the vertical, a receiver housing adapted to be affixed to a headboard or a footboard of a bed frame, said receiver housing having a vertically oriented opening, said receiver housing having a pair of pins extending transversely across said opening, said hook plate being adapted to fit into said opening so as to affix said hooks to said pins, and a lever arm pivotally affixed to said receiver housing, said lever arm being pivotable to engage said hook plate to force said hook plate in a downward direction to cause said pins and said forward edge of said slot to forcefully engage each other, and a locking mechanism operable to lock said lever arm in a position holding said pins forcefully against said forward edges of said slot.

17. A locking mechanism as defined in claim 16 wherein said receiver housing is adapted to be affixed to a bracket of said headboard or footboard.

18. A locking mechanism as defined in claim 16 wherein said receiver housing is adapted to fit with an opening in a headboard to be contained within a headboard or footboard.

19. A locking mechanism as defined in claim 16 wherein said receiver housing is adapted to be surface mounted to a headboard or a footboard.

20. A locking mechanism as defined in claim 16 wherein said hook plate is comprised of a cast metal.

21. A locking mechanism as defined in claim 16 wherein said hook plate is comprised of a laminated metal plate construction.

22. A locking mechanism as defined in claim 16 wherein said hook plate is adapted to be inserted into an opening formed in the end of a side rail, said hook plate having a plurality of lateral openings having an angled internal surface, a lug extending through each of said plurality of lateral openings and means to force said lugs against said angled internal surface to bias said hook plate toward the internal end of an opening formed in a side rail to forcefully retain the hook plate in an opening of a side rail.

23. A locking mechanism as defined in claim 22 wherein said means to force said lugs against said angled surface comprises a threaded screw engaged in said threaded lugs, wherein tightening said screws in said lugs forces said lugs against said angled surface to bias said hook plate inwardly of a side rail.

24. A method of affixing a side rail to a headboard in the formation of a bed frame, said method comprising the steps of:
   providing a receiver housing having a vertical elongated opening, said receiver housing having a transverse pin spanning said slot,
   affixing the receiver housing to a headboard,
   providing a hook plate having a hook extending outwardly therefrom,
   affixing the hook plate to the side rail with said hook extending longitudinally outwardly from an end of the side rail,
   providing a side rail having a hook extending outwardly therefrom,
   inserting the hook into the vertically aligned slot in the receiver housing to engage the hook over the transverse pin to affix the side rail to the headboard,
   providing a lever arm pivotally affixed to the receiver housing at a pivot point,
   pivoting the lever arm about the pivot point to cause the lever arm to engage the hook plate and to force the hook plate downwardly to forcefully engage the hook with the transverse pin.

25. A method as defined in claim 24 wherein said step of pivoting the lever arm further includes the step of locking the lever arm in a locked position when the hook has engaged the transverse pin.

26. A method as defined in claim 25 wherein said step of locking the lever arm comprises providing a lock a lock on the lever arm and pivoting the lever arm until the lock is in a predetermined position to lock the lever arm in the locked position.

27. A method as defined in claim 24 wherein said step of providing a hook plate comprises providing a hook plate having a hook formed by a recess having a leading edge of a predetermined angle between about 5 degrees and about 15 degrees with respect to the vertical.

28. A method as defined in claim 24 wherein said step of affixing the receiver housing to the headboard comprises inserting the receiver housing into an opening formed in the headboard.

29. A method as defined in claim 24 wherein said step of affixing the hook plate to the side rail comprises inserting the hook plate into an opening formed in the side rail.

30. A locking mechanism for use in affixing two structural components together, said locking mechanism comprising a hook plate, said hook plate adapted to be affixed to one of said members and having at least one hook extending longitudinally outwardly from said one component, said at least one hook being formed so as to have a slot having a forward edge disposed at a predetermined angle with respect to the vertical, a receiver housing adapted to be affixed to the other component, said receiver housing having a vertically oriented opening, said receiver housing having at least one pin extending transversely across said opening, said hook plate being adapted to fit into said opening so as to affix said at least one hook to said at least one pin, and a lever arm pivotally affixed to said receiver housing, said lever arm being pivotable to engage said hook plate to force said hook plate in a downward direction to cause said at least one pin and said forward edge of said slot to forcefully engage each other, and a locking mechanism operable to lock said lever arm in a position holding said at least one pin forcefully against said forward edges of said slot.

31. The locking mechanism as defined in claim 30 wherein said at least one hook comprises a pair of hooks and said at least one slot comprises a pair of slots.

32. A locking mechanism as defined in claim 30 wherein said hook plate is comprised of a cast metal.

33. A locking mechanism as defined in claim 30 wherein said lever arm includes a spring, said spring adapted to engage said hook plate and to be moved to an over the center position where said spring holds said lever arm in the locked position.

34. A locking mechanism as defined in claim 33 wherein said spring engages said lever arm includes a spring, said spring adapted to engage said hook plate and to be moved to an over the center position where said spring holds said lever arm in the locked position.

* * * * *